US010685116B2

(12) United States Patent
Satpathy

(10) Patent No.: US 10,685,116 B2
(45) Date of Patent: Jun. 16, 2020

(54) ANTI-RANSOMWARE SYSTEMS AND METHODS USING A SINKHOLE AT AN ELECTRONIC DEVICE

(71) Applicant: McAfee, LLC, Santa Clara, CA (US)

(72) Inventor: Ghanashyam Satpathy, Karnataka (IN)

(73) Assignee: McAfee, LLC, Santa Clara, CA (US)

( * ) Notice: Subject to any disclaimer, the term of this patent is extended or adjusted under 35 U.S.C. 154(b) by 261 days.

(21) Appl. No.: 15/903,962

(22) Filed: Feb. 23, 2018

(65) Prior Publication Data

US 2019/0266327 A1    Aug. 29, 2019

(51) Int. Cl.
*G06F 21/56* (2013.01)
*H04L 29/06* (2006.01)
*G06F 21/62* (2013.01)

(52) U.S. Cl.
CPC .......... *G06F 21/566* (2013.01); *G06F 21/568* (2013.01); *G06F 21/6218* (2013.01); *H04L 63/1491* (2013.01)

(58) Field of Classification Search
CPC .. G06F 21/566; G06F 21/568; G06F 21/6218; H04L 63/1491
See application file for complete search history.

(56) References Cited

U.S. PATENT DOCUMENTS

| | | | |
|---|---|---|---|
| 9,405,903 B1 * | 8/2016 | Xie | G06F 21/56 |
| 9,560,072 B1 * | 1/2017 | Xu | H04L 63/1416 |
| 2015/0326599 A1 * | 11/2015 | Vissamsetty | H04L 63/02 726/11 |
| 2016/0261631 A1 * | 9/2016 | Vissamsetty | H04L 63/1491 |
| 2016/0323316 A1 * | 11/2016 | Kolton | H04L 63/145 |
| 2017/0034189 A1 * | 2/2017 | Powell | H04L 63/1416 |
| 2017/0171244 A1 * | 6/2017 | Vissamsetty | H04L 63/1491 |
| 2018/0288076 A1 * | 10/2018 | Onodera | G06F 21/554 |

FOREIGN PATENT DOCUMENTS

| | | |
|---|---|---|
| WO | 2017053745 | 3/2017 |
| WO | 2017125935 | 7/2017 |

OTHER PUBLICATIONS

International Searching Authority, "Search report and written opinion," issued in connection with PCT patent application No. PCT/US2019/018556, dated May 15, 2019, 12 pages.

\* cited by examiner

*Primary Examiner* — Sher A Khan
(74) *Attorney, Agent, or Firm* — Hanley, Flight and Zimmerman, LLC

(57) ABSTRACT

Methods, apparatus, systems, and articles of manufacture to remediate ransomware are disclosed. An example malware scanner includes a sinkhole generator to generate a sinkhole directory. The example malware scanner includes a storage device adapted to store a computer file and the sinkhole directory, wherein the sinkhole directory recursively expands when the computer file performs a file listing of the sinkhole directory to occupy the computer file by extending a period of time taken to perform the file listing of the sinkhole directory. The example malware scanner includes an analyzer to monitor execution of the computer file while the computer file is performing the file listing of the sinkhole directory to attempt to identify an indicator of compromise associated with the computer file, the analyzer to classify the computer file as ransomware when the analyzer identifies the indicator of compromise. The example malware scanner includes a cleaner to remediate the ransomware.

12 Claims, 8 Drawing Sheets

```
C:\test\!
C:\test\$
C:\test\!\TestDocument.docx
C:\test\$\!
C:\test\$\$
C:\test\$\!\TestDocument.docx
C:\test\$\$\!
C:\test\$\$\$
C:\test\$\$\!\TestDocument.docx
C:\test\$\$\$\!
C:\test\$\$\$\$
C:\test\$\$\$\!\TestDocument.docx
C:\test\$\$\$\$\!
C:\test\$\$\$\$\$
C:\test\$\$\$\$\!\TestDocument.docx
C:\test\$\$\$\$\$\!
C:\test\$\$\$\$\$\$
C:\test\$\$\$\$\$\!\TestDocument.docx
C:\test\$\$\$\$\$\$\!
C:\test\$\$\$\$\$\$\$
C:\test\$\$\$\$\$\$\!\TestDocument.docx
...
```
— 600

FIG. 6 ated. Additionally,
due to a very highly parallel processing ability, a ransom-
ware process takes little time to infect a target system,
making it harder for a behavioral (e.g., machine learning-
based) antivirus scanner to detect.

ANTI-RANSOMWARE SYSTEMS AND METHODS USING A SINKHOLE AT AN ELECTRONIC DEVICE

FIELD OF THE DISCLOSURE

This disclosure relates generally to electronic security, and, more particularly, to anti-ransomware methods and apparatus using a sinkhole at an electronic device.

BACKGROUND

In recent years, malicious programs or software, also referred to as malware, has taken on numerous new forms and advanced in capabilities at an increasing rate. Software tools exist to detect and eliminate these threats, as well as to mitigate or remediate any harm that they cause to an end-user's computing device. Some forms of malicious software can delete files from the computing device and/or render files inaccessible without the end-user's knowledge or consent.

Malware can be any program that performs harmful or potentially harmful activity on a computer, generally without the knowledge and/or consent of the user. Malware includes, but is not limited to, viruses, Trojan horses, backdoors, keyloggers, rootkits, ransomware, remote-access tools, worms, and exploits. Malware can perform various functions, such as the modification of a user's personal files or eavesdropping on a user's activity. Ransomware is an example form of malware in which a user's data is made inaccessible, either via deletion or modification (e.g., via encryption or corruption), and held for ransom (e.g., until a payment for the return of the data is made).

Asymmetric ransomware prototypes were designed to show how cryptography can be used to mount extortion-based attacks that cause a loss of access to information and information leakage. Public-key cryptography can also be used for computer attacks, and usage of multiple keys in asymmetric public key cryptography allows ransomware to encrypt items on a system with a public key while never exposing the private key, thus keeping the private key a secret. For ransomware, encryption using a public key while keeping the private key secret is essential for "mangling" data files without exposing information that someone could use to figure out how to undo the encryption.

Occurrence of ransomware has increased with the advent of Bitcoin. Bitcoin is a digital asset and payment system providing a decentralized digital currency and anonymity in commercial transactions. The decentralized, anonymous nature of Bitcoin make Bitcoin very attractive to ransomware developers as a payment method for their ransomware schemes. Ransomware developers have begun incorporating a Bitcoin transaction into their ransomware.

For example, there is no central bank or authority for Bitcoin currency, so Bitcoin value cannot be manipulated by any such authority. Additionally, people conducting a Bitcoin transaction have a significant amount of privacy. Bitcoin networks are pseudonymous, and there is no easy way to link Bitcoin account addresses to real-world identities. Bitcoin currency can be sent across borders, and transactions are not location-specific. Further, basic Bitcoin transactions are irreversible. Once a transfer is made, there is no way for a third party to force a chargeback (as with a credit card). Recently, new, unique ransomware binaries have spiked based on easier involvement in the ransomware process through Bitcoin payments and more difficult detection of ransomware binaries. With ransomware-as-a-service, for example, an affiliate need not possess a particular programming or other technical skill but rather have a willingness to spread the ransomware (e.g., through email botnets that are easy for a non-programmer to set up, etc.).

Encouraged by the lucrative business model and possibility for revenue sharing, ransomware authors have made it difficult to detect ransomware binaries using traditional antivirus software. Highly polymorphic code and code obfuscation/encryption techniques render ransomware difficult for a signature-based scanner to detect. Additionally, due to a very highly parallel processing ability, a ransomware process takes little time to infect a target system, making it harder for a behavioral (e.g., machine learning-based) antivirus scanner to detect.

BRIEF DESCRIPTION OF THE DRAWINGS

FIG. 6 shows an example recursive sinkhole directory listing.

The figures are not to scale. Wherever possible, the same reference numbers will be used throughout the drawing(s) and accompanying written description to refer to the same or like parts.

DETAILED DESCRIPTION

Figure 1:
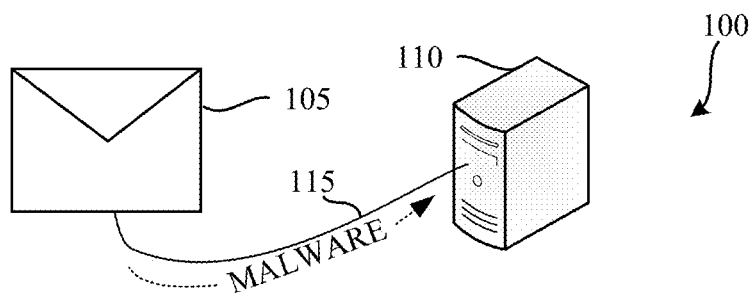
FIG. 1 is a diagram illustrating an example environment of use including an electronic message transmitted to an electronic device.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an example implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

Various malware protection tools exist to protect computing devices from the threat of malware. Traditionally, malware protection tools attempt to combat malware using techniques including monitoring of downloaded files and comparison of downloaded files to known malware signatures (also referred to as definitions), monitoring of system processes for modifications to critical system files, monitoring of new files for a designated period to ensure their behavior is not suspicious, as well as many other techniques. In some examples, after a malware protection tool technique identifies malware on the computing device, a malware protection tool can eliminate the malware (e.g., by terminating the malware and deleting the malware's file data, etc.) or quarantine the malware (e.g., moving and encrypting the malware file to lock the malware and prevent the malware from accessing files or being accessed by other programs, etc.). While these techniques are sufficient for many malware threats, in some examples, undetected, advanced or highly complex threats evade the detection or intervention of tools.

Ransomware can be sent to a computing device via an email attachment, website compromise, etc. Once on the device, the ransomware communicates with an encryption key server. The ransomware then searches for user and/or other non-operating system files (e.g., .jpg, .bmp, .pdf, .docx, .xlsx, etc.). File listing can begin with information from a user profile folder, for example. The ransomware encrypts files by encrypting and renaming user and/or other non-operating system files, for example. The ransomware has then compromised those files and can lock the computing device, remaining persistent after reboot of the device and its operation system, for example.

In certain examples, a sinkhole can be implemented on a computer to defeat ransomware executing or attempting to execute on that computer. The process of sinkholing involves redirecting program execution, data traffic, etc., from its original target to one specified by the sinkhole owners. A sinkhole (also referred to as a black hole) is an altered destination (e.g., Internet Protocol (IP) address, code segment, data set, file location, etc.) provided by a system (e.g., by antivirus software, a computer security processor, etc.) to redirect or "distract" malicious code from its intended target to a fake target that will not harm or otherwise affect system operation.

In certain examples, a ransomware file arrives at a computing device (e.g., a smartphone, tablet computer, laptop computer, desktop computer, server, etc.) such as via a phishing email, compromised website, other infected document, etc. The ransomware process begins executing on the computing device and obtains an encryption key from a command and control server. The computing device is configured with a sinkhole triggered by an incoming file (e.g., an incoming file including the ransomware program, etc.) to distract and occupy the ransomware process in processing a listing of files (e.g., .docx, .pdf, .jpg, .xlsx, etc.) through a recursive, decoy directory forming the sinkhole. The file listing of the ransomware process in the sinkhole creates sufficient indicators of compromise (IOC) for behavioral tracking software executing on the computing device to identify the ransomware. The behavioral tracking process can then quarantine, delete, and/or otherwise disable the ransomware and prevent the ransomware process from encrypting files on the computing device. Thus, the computing device remains uninfected.

IOC for ransomware can include actions, commands, and/or other processes such as generating a unique computer identifier, retrieving an external IP address, injection into clean processes such as explorer.exe, svchost.exe, etc. IOC can include ensuring "reboot survival" by installing the ransomware program to run at computer device start-up (e.g., through service entry, scheduled task, AutoRun key, etc.), for example. IOC can include deactivating shadow copies, start-up repair, operating system error recovery, etc. IOC can include stopping an operating system security center, update service, error reporting, antivirus software, file transfer (e.g., Background Intelligent Transfer Service (BITS), etc.), etc.

In certain examples, the sinkhole functions as a recursive file system (e.g., New Technology File System (NTFS), File Allocation Table (FAT) file system, High Performance File System (HPFS), etc.) junction point established by an operating system (e.g., Microsoft Windows™ OS, Apple iOS™, etc.). In Windows™, for example, an NTFS junction point is a symbolic link to a directory that acts as an alias of that directory. Since the Windows Vista™ operating system, Microsoft has included an NTFS junction from C:\Documents and Settings to C:\Users to support legacy software, for example. User profile folders can include NTSF junctions as well.

A hard link refers to a file name, typically in a directory entry, that points or links to a target data file. In contrast, a soft link, also referred to as a shortcut, indirectly links to the target file by pointing to the file's hard link, or another location from which direct access to the file is possible. If a hard link is deleted, but another hard link exists to the target data file, then the target data file will still be accessible, and the original file can be restored. Hard links are supported by many operating systems (e.g., Windows NT® and later Windows® operating systems, Linux®, Android®, macOS®, etc.) and file systems (e.g., NFTS, etc.).

Reparse points provide another way of creating links. If a file or a directory has a reparse point attached, the system calls a file system filter as indicated by a reparse point tag associated with the reparse point. The filter can implement any method of accessing the actual data. For example, Hierarchical Storage Management (HSM) can be used with a reparse point to access data.

In order to open and encrypt files for ransom, ransomware needs a listing of files. Certain ransomware examples use a recursive file system mountpoint to occupy the ransomware process with fake or "dummy" canary files while a malware detection process monitors to detect and kill the ransomware process. Testing on multiple samples shows that ransomware is ignorant of the fact that the NTSF junction folder is a reparse point, much less a recursive point.

In one example of ransomware detection, thirty-two (32) instances of the same file are provided as a canary or decoy in a recursive directory. The ransomware encrypts the file 32 times. In certain examples, adding another recursive mount point generates an exponential increase in the instances of files. Creating a NTFS junction that points to a root of the volume exposes all available files for the ransomware including the canary files with the recursive mountpoint. Processing of these files by the ransomware delays file encryption by the ransomware and allows a malware scanner to identify and remediate the ransomware from the computing device before the ransomware is able to infect the computing device and/or files on the computing device. Therefore, sinkholes provide a good IOC and provide a delay period that occupies the ransomware while a malware scanner runs.

Thus, sinkholes can be created on-demand at an endpoint before a behavioral malware scanner is triggered to trace file activity, and, the sinkhole can be cleared once a scan and processing is complete. Sinkholes can also be implemented system-wide as an ongoing mechanism to "trap" ransomware processes and enable additional time and activity for ransomware detection and remediation.

FIG. 1 is a diagram illustrating an example environment of use 100 including an electronic message 105 (e.g., an email, text message, web link, downloaded file, etc.) transmitted to an electronic device 110. In the illustrated example of FIG. 1, the message 105 includes malware 115 delivered to the electronic device 110. The electronic device 110 of the illustrated example of FIG. 1 is a desktop computer. However, any other type of electronic device may additionally or alternatively be used such as a laptop computer, a smartphone, a tablet computer, a smart watch, other computing device, etc.

In some examples, a file including malware can be transmitted to the electronic device 110 (e.g., from a web server and/or file server via a web browser, from another electronic device via a mail server, etc.). As used herein, a file can include information and/or data to be transferred for storage, relay, and/or execution at the electronic device 110. For example, the file can include instructions to be executed by the electronic device 110, image data, user-identifying information, etc. In some examples, such data transfer is performed without the knowledge of the user. For example, a storage device (e.g., a USB thumb drive, etc.) can be inserted into the electronic device 110 and/or the electronic device 110 can be connected to a network which automatically triggers (e.g., without alerting and/or requesting permission for a user, etc.) transfers files (e.g., malware, etc.) to the electronic device 110.

Figure 2:
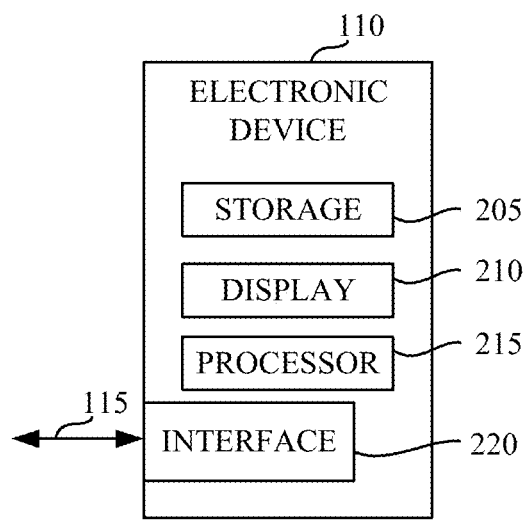
FIG. 2 illustrates an example implementation of the electronic device of FIG. 1.

FIG. 2 illustrates an example implementation of the electronic device 110. As noted above, the example electronic device 110 can be implemented by a variety of electronic/computing devices such as a desktop computer, laptop computer, tablet computer, smartphone, mobile device accessory, etc. In the illustrated example of FIG. 1, the electronic device 110 is a desktop computer. The example electronic device 110 includes a storage 205, display 210, processor 215, and interface 220. The example electronic device 110 receives the malware 115 via the interface 220, for example.

The example storage 205 of the illustrated example of FIG. 2 is implemented by any memory, storage device and/or storage disc for storing data such as flash memory, magnetic media, optical media, etc. Furthermore, the data stored in the example storage 205 can be in any data format such as binary data, comma delimited data, tab delimited data, structured query language (SQL) structures, etc. While in the illustrated example the example storage 205 is illustrated as a single element, the example storage 205 and/or any other data storage elements described herein can be implemented by any number and/or type(s) of memories. In the illustrated example of FIG. 2, the example storage 205 can store any type of data for use by the electronic device 110 including, for example, data files, operating system files, configuration files, executables, etc.

The example display 210 of the illustrated example of FIG. 1 is implemented by any display device capable of presenting information from the electronic device 110. In some examples, the display device 210 is a graphical display. However, any other type of display may additionally or alternatively be used such as, for example, a light emitting diode (LED), an organic light emitting diode (OLED), a liquid crystal display, a cathode ray tube display (CRT), a touchscreen, a tactile output device, etc.

The example processor 215 executes instructions at the electronic device 110 to, for example, implement an operating system, execute an application, store data, etc. The example processor 215 is hardware and can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)), etc.

The example interface 220 of the illustrated example of FIG. 2 is an Ethernet or Wi-Fi interface, and/or can also be implemented as a USB interface, etc. However, any other past, present, and/or future type of interface may additionally or alternatively be used. Moreover, in some examples, the interface can be implemented by a wireless interface such as a Bluetooth™ interface, a Near Field Communication (NFC) interface, etc. In examples disclosed herein, the interface 220 enables the electronic device 110 to communicate with one or more external devices, systems, etc.

Figure 3:
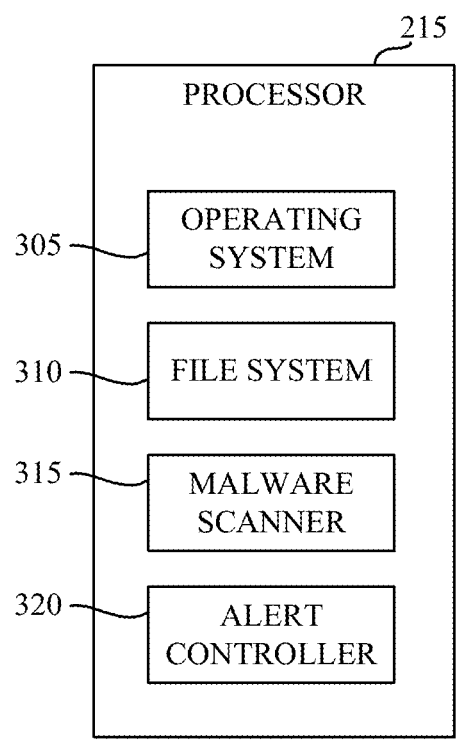
FIG. 3 illustrates an example implementation of the processor of the example electronic device of FIG. 2.

FIG. 3 illustrates an example implementation of the processor 215 of the example electronic device 110 of FIGS. 1 and/or 2. The example processor 215 of FIG. 3 includes an operating system 305, a file system 310, a malware scanner 315, and an alert controller 320.

The example operating system 305 is system software to manage hardware and software resources of the electronic device 110, for example. The example operating system 305 is leveraged by the file system 310 and/or applications executing on the example electronic device 110. The example file system 310 organizes and controls how data is stored and retrieved on the electronic device 110. The file system 310 can be implemented as part of and/or as separate from the operating system 305, for example. The example file system 310 provides space in memory (e.g., the example storage 205, etc.) for files to be organized for storage, retrieval, etc.

The example malware scanner 315 performs scans of the electronic device 110, such as to detect ransomware attempting to compromise the electronic device 110 (e.g., by encrypting files, modifying the file system 310, etc.), etc. In certain examples, the malware scanner 315 looks for indicators of compromise (IOC) to identify ransomware and/or other malware 115 operating and/or attempting to operate to adversely affect the electronic device 110. For example, the malware scanner 315 looks for IOC including a program and/or other computer process that is attempting to: generate a unique computer identifier; retrieve an external IP address; inject itself into an otherwise known, clean application and/or operating system process; modify device start-up service/task; modify/deactivate/stop operating system error recovery, background process, update, error reporting, antivirus scan, file transfer, etc.

In certain examples, the malware scanner 315 generates, dynamically (e.g., upon a file transfer, file request, application execution, other trigger, etc.) and/or in advance of ongoing system operation (e.g., at start-up, set-up, etc.), a sinkhole pointing to and/or otherwise forming a directory including a recursive list of artificial files in the file system 310 to occupy execution of a ransomware and/or other malware process executing on the electronic device 110. When the ransomware process, for example, attempts to index files in the file system 310, the sinkhole creates, in response to ransomware application query, a recursive directory structure including a linked file that is recursively indexed by the ransomware process, thereby occupying the processing ability and available bandwidth of the ransomware process. That is, the ransomware is tricked into interpreting the sinkhole as a large directory of files. In turn, the ransomware attempts to traverse the recursive directory structure and encrypt its files. Since ransomware needs a listing of files to open and encrypt the files, a sinkhole including a recursive directory mountpoint occupies the ransomware process with canary files (e.g., false or decoy files, folders, etc.) while the malware scanner 315 tries to detect and kill the ransomware process, for example.

In examples disclosed herein, a ransomware and/or malware scan implemented by the malware scanner 315 can be performed based on malware signatures and/or other malware detection information (e.g., stored in the storage 205, etc.). As used herein, malware is any data that can be used to interfere with operation of a device. In some examples, the malware may be malicious and be intended to exfiltrate user information (e.g., social security information, usernames, passwords, personal information, etc.). In other examples, the malware can be ransomware and be intended to lock and/or otherwise remove access to files until a fee is paid. As used herein, malware signatures include any information that may be used to detect malware such as, for example, patterns of data that are known to be malicious, uniform resource locators (URLs) known to be malicious, computing actions taken known to encrypt or compromise file access, etc. In certain examples, malware signatures and/or other malware detection information stored in the storage 205 can be updated by, for example, communicating with an external server via the interface 220 of the electronic device 110. Using the results of the scan, the example malware scanner 315 may determine whether the electronic device 110 is "clean", and can trigger further action with respect to the electronic device 110, detected malware, etc.

The example alert controller 320 enables alerts to be presented via the example electronic device 110. In some examples, the alert controller 320 causes an alert message to be displayed via the display 210 of the example electronic device 110. Example alerts can be displayed by, for example, displaying a notification message, a pop-up, etc. For example, if the electronic device 110 is implemented using a desktop computer, a pop-up window can be displayed via the display 210 to notify a user that an execution of ransomware on the electronic device 110 was attempted. In some examples, the alert controller 320 receives a response via the alert presented to the user (e.g., via the electronic device 110, etc.). Such a response may be used to, for example determine how to handle a file where malware is detected (e.g., accept the file, delete the file, terminate a connection, take no action, etc.)

Figure 4:
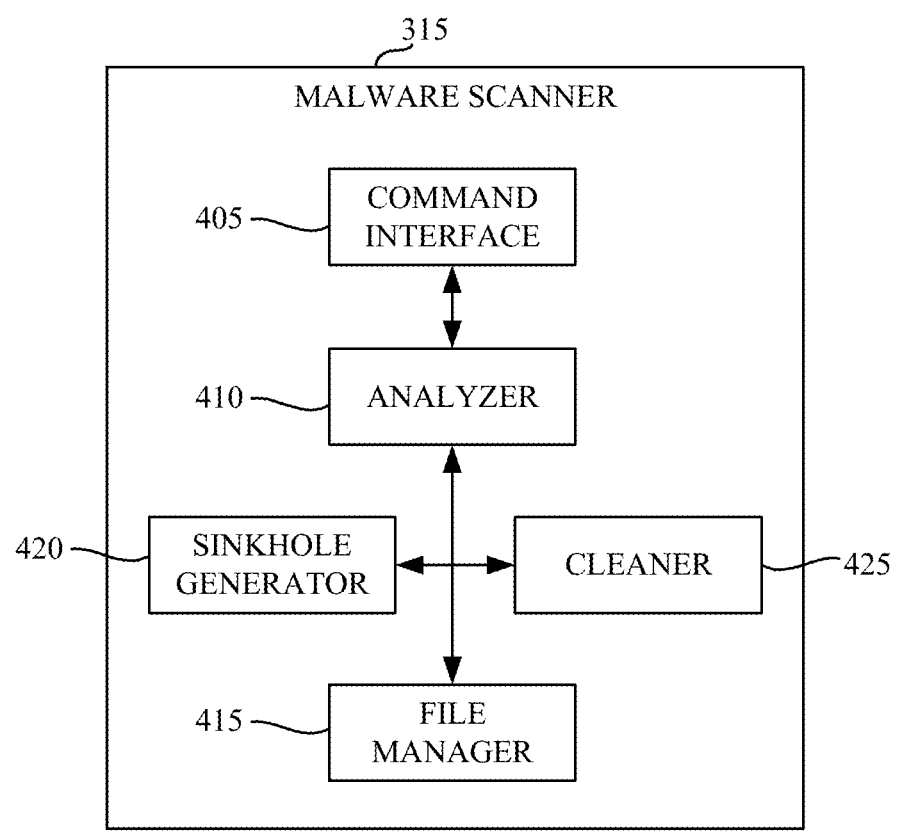
FIG. 4 illustrates an example implementation of the malware scanner of FIG. 3.

FIG. 4 illustrates an example implementation of the malware scanner 315. The example malware scanner 315 of FIG. 4 includes a command interface 405, an analyzer 410, a file manager 415, a sinkhole generator 420, and a cleaner 425.

As shown in the example of FIG. 4, the command interface 405 monitors interactions (e.g., incoming commands, application and/or other process execution, etc.) with the operating system 305 and the file system 310 to receive input to help the analyzer 410 determine IOC. The example analyzer 410 works with the file manager 415 to route command(s) and/or other application/process execution to a sinkhole created in the file system 310 by the sinkhole generator 420. As a process (e.g., a ransomware and/or other malware process) operates on the sinkhole, the analyzer 410 looks for IOC to classify the process as ransomware, for example.

For example, ransomware 115 arrives on the electronic device 110 through an email attachment, compromised website access, etc. Once active, the ransomware 115 communicates with a command and control server, such as an encryption key server, etc. The ransomware process 115 then searches the file system 310 of the electronic device 110 (e.g., starting with a user profile folder, etc.) to locate files of a certain type such as user/non-operating system files including image (e.g., .jpg, .gif, etc.), text document (e.g., .doc, .docx, etc.), spreadsheet (e.g., .xls, .xlsx, etc.), fixed layout electronic file (e.g., .pdf, etc.). The ransomware 115 then tries to encrypt identified files by renaming, encrypting, and renaming files. Through the renaming and encryption, the ransomware 115 locks the system 110 by hiding and rendering files inaccessible. The ransomware 115 remains persistent after reboot, restart, etc.

In certain examples, the sinkhole formed by the sinkhole generator 420 occupies the ransomware process 115 on the electronic device 110 to recursively list files (e.g., decoy or canary files, etc.) while the analyzer 410 is monitoring operations to detect the ransomware and/or other malware. The ransomware 115 generates IOC via its interaction with the sinkhole and creates sufficient IOC for behavioral tracing to be detected by the analyzer 410. Once the ransomware 115 is identified by the analyzer 410, the cleaner 425 can quarantine, delete, and/or otherwise remove the ransomware 115 before the ransomware process 115 encrypts files and infects the electronic device 110, for example. If the process is not a ransomware process, the innocuous process will not attempt to generate the same file listing as a ransomware process and will not be delayed in the sinkhole as a ransomware process would. That is, since a ransomware process seeks to comprehensively identify the file listing to identify files to be targeted, the ransomware process is trapped in the recursive sinkhole seeking a comprehensive file listing. Other processes are not interested in such a comprehensive file listing and can avoid being stuck in the sinkhole loop.

For example, when the operating system 305 is a Microsoft Windows™ style operating system, the ransomware 115 attempts to retrieve a listing of files from the file system 310. The file manager 415 routes the ransomware process 115 to the sinkhole in which the ransomware process 115 searches the sinkhole to identify files. The sinkhole is and/or is formed by the sinkhole generator 420 in a junction point folder (e.g., C:\user, C:\Documents, etc.) that can link to other folders. In certain examples, the folder is indexed in an alphabetical and/or other priority order. For example, when the ransomware process 115 performs a search, the ransomware 115 first locates a folder labeled according to a non-alphanumeric punctuation mark (e.g., "!", "$", etc.). For example, a folder labeled "cAtest\!" can include a canary file document "testdocument.docx" and a junction "$" that points back to the "C:\test\!" folder. As the ransomware 115 processes the items in the C:\test\! folder, the ransomware 115 keeps looping back to the same C:\test\! folder, for example. Some ransomware processes 115 can be caught in the sinkhole loop indefinitely. Other ransomware processes 115 iterate a number of times (e.g., 32 times, 50 times, 100 times, etc.) over a period of time (e.g., 10 minutes, 12 minutes, 15 minutes, etc.) before evaluating the sinkhole. As the ransomware 115 iterates, the ransomware 115 repeatedly encrypts files, which generates IOCs for detection by the analyzer 410.

Thus, the junction points in the sinkhole trigger iteration to spawn additional junctions and canary files for the ransomware 115 to search, analyze, and encrypt. The activity of the ransomware 115 is detected by the analyzer 410, and the analyzer 410 can trigger the cleaner 425 to remediate (e.g., quarantine, delete, etc.) the ransomware 115 before it can infect actual useful files of the file system 310 of the electronic device 110. Thus, the sinkhole occupies the ransomware by causing the ransomware to waste time on sinkhole files in a recursive sinkhole directory. During that wasted time, processes have time to search for and evaluate the ransomware process.

In contrast, current ransomware detection approaches do not include the sinkhole and damage is already done to the electronic device 110 and its files by the time the ransomware is detected. Once detected, further damage can be stopped, but damage already done cannot be repaired. Thus, certain examples provide a technological improvement to operating system 305 and file system 310 operation and malware scanner 315 ability to detect and remediate ransomware 115 before damage is done to the electronic device 110 and its files.

In certain examples, the sinkhole generator 420 can implement the sinkhole as a recursive junction point (e.g., an NTFS junction, etc.) in the operating system 305. The junction point is a symbolic link to a directory that acts as an alias for that directory. A reparse point provides another way to create a link to a directory in the file system 310. For example, if a file or a directory has a reparse point attached, the operating system 305 and/or the file system 310 calls a file system filter indicated by a reparse point tag associated with the reparse point. The file system filter can implement a method to access associated data. The ransomware 115 is unaware that a folder in the sinkhole is a reparse point, much less a recursive one.

Although reparse points can be linked (e.g., links are referred to as junctions) to directories using a reparse points mechanism, files cannot be linked aside from writing a custom file system filter driver. If the referenced directory is moved or deleted, the junction will point to nowhere. However, since a junction can be a soft link, the junction is not limited to objects residing in the same storage location (e.g., on the same drive, etc.). Rather, the junction can point to a directory at a different location (e.g., on a different drive, or even point to the drive itself, etc.). A junction, however, is not allowed to point to a mapped network object.

In certain examples, Microsoft Windows™ limits a file path length (e.g., "MAX_PATH") to prevent in infinitely long recursive path. In the Windows application programming interface (API), a maximum length for a path, MAX_PATH, is defined as 260 characters. Thus, the maximum path on drive X is "X:\some 256-character path string<NUL>". Additionally, to prevent buffer overflows and "infinite" loops on local drives, both command prompt and Windows Explorer™ halt their recursion when the directory depth reaches 32 or the pathname exceeds 256 characters, whichever comes first.

Thus, certain examples create a folder (referred to as "C:\Test\!" for purposes of illustration only) and generate a document inside that folder (e.g., a canary file referred to as "C:\Test\!\TestDocument.docx" for purposes of illustration only). Then, a junction named "$" is created and pointed to the C:\Test folder, for example. With this configuration, 32 instances of the same file are seen by the ransomware 115, which encrypts this one file 32 times. Adding another recursive mount point in the folder generates an exponential increase in the instances of files. Creating a NTFS junction that points to a root of the volume exposes all available files in the folder for the ransomware 115. Such a folder structure allows the sinkhole to delay file encryption by the ransomware 115.

In one example, a link/junction can be created and managed by the sinkhole generator 420 using command line utility Mklink (e.g., create a junction $ pointing to C:\using System("mklink/J C:\\$ C:\\"), etc.). A junction can also be removed (e.g., deleting junction $ at C:\ using System ("rmdir/S Q C:\\$"), etc.). Using the API associated with the operating system 305 (e.g., Microsoft Windows™ API, etc.), the link/junction can be managed. First, a directory can be created if it does not exist (e.g., using CreateDirectory (szJunction, NULL), etc.). If the directory exists, it must be empty because a reparse point cannot be associated with a non-empty directory. A directory handle can be obtained to open the directory for reading and writing (e.g., using HANDLE hDir=OpenDirectory(szJunction, TRUE), etc.). Then, the reparse point is created and associated with the directory.

For example, the reparse point can be created by the sinkhole generator 420 as follows:

```
// Note that buf and ReparseBuffer occupy the same space
BYTE buf[sizeof(REPARSE_MOUNTPOINT_DATA_BUFFER) +
MAX_PATH * sizeof(WCHAR)];
REPARSE_MOUNTPOINT_DATA_BUFFER& ReparseBuffer =
(REPARSE_MOUNTPOINT_DATA_BUFFER&)buf;
// Prepare reparse point data
memset(buf, 0, sizeof(buf));
ReparseBuffer.ReparseTag = IO_REPARSE_TAG_MOUNT_POINT;
int len = ::MultiByteToWideChar(CP_ACP, 0, szTarget, -1,
    ReparseBuffer.ReparseTarget, MAX_PATH);
ReparseBuffer.ReparseTargetMaximumLength = (len--) * sizeof(WCHAR);
ReparseBuffer.ReparseTargetLength = len * sizeof(WCHAR);
ReparseBuffer.ReparseDataLength = ReparseBuffer.ReparseTargetLength +
    12;
// Attach reparse point
DWORD dwRet;
::DeviceIoControl(hDir, FSCTL_SET_REPARSE_POINT, &ReparseBuffer,
    ReparseBuffer.ReparseDataLength+REPARSE_MOUNTPOINT_HE
    ADER_SIZE, NULL, 0, &dwRet, NULL);
```

In this example, the szTarget includes a path prefixed with a "non-parsed" prefix "\??\" and terminated with a backslash character, such as "\??\C:\Some Dir\", etc.

As the ransomware process 115 attempts to navigate the recursive sinkhole, the analyzer 410 monitors application and system behavior to look for IOCs. As encryption is delayed by the sinkhole, the analyzer 410 applies heuristics, machine learning, and/or other behavioral security application on monitored activities and/or other events generated by the ransomware 115, for example. However, as the analyzer 410 is processing the behavior of the ransomware 115 in the sinkhole, the file system 310 stays uninfected by the ransomware 115 as the ransomware 115 processes file listings from the sinkhole.

In certain examples, multiple sinkholes can be combined, nested, positioned adjacent to each other, etc., to further delay the ransomware 115. For example, WANNACRY ransomware is delayed by approximately 12 minutes with one sinkhole and by more than 30 minutes with two sinkholes. The analyzer 410 detects and the cleaner 425 remediates the WANNACRY ransomware after 2-3 minutes, for example. Other ransomware families such as CRYPTOLOCKER, LOCKY, etc., are unable to infect the electronic device 110 with a sinkhole including a canary file.

While an example implementation of the example electronic device 110 of FIG. 1 is illustrated in FIGS. 2, 3, and/or 4, one or more of the elements, processes and/or devices illustrated in FIGS. 2-4 can be combined, divided, rearranged, omitted, eliminated and/or implemented in any other way. Further, the example storage 205, the example display 210, the example processor 215, the example interface 220, the example operating system 305, the example file system 310, the example malware scanner 315, the example alert controller 320, the example command interface 405, the example analyzer 410, the example file manager 415, the example sinkhole generator 420, the example cleaner 425, and/or, more generally, the example electronic device 110 of FIGS. 1-4 can be implemented by hardware, software, firmware and/or any combination of hardware, software and/or firmware. Thus, for example, any of the example storage 205, the example display 210, the example processor 215, the example interface 220, the example operating system 305, the example file system 310, the example malware scanner 315, the example alert controller 320, the example command interface 405, the example analyzer 410, the example file manager 415, the example sinkhole generator 420, the example cleaner 425, and/or, more generally, the example electronic device 110 of FIGS. 1-4 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example storage 205, the example display 210, the example processor 215, the example interface 220, the example operating system 305, the example file system 310, the example malware scanner 315, the example alert controller 320, the example command interface 405, the example analyzer 410, the example file manager 415, the example sinkhole generator 420, the example cleaner 425, and/or, more generally, the example electronic device 110 of FIGS. 1-4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example electronic device 110 of FIGS. 1, 2, 3, and/or 4 can include one or more elements, processes and/or devices in addition to, or instead of, those illustrated in FIGS. 2, 3, and/or 4, and/or can include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
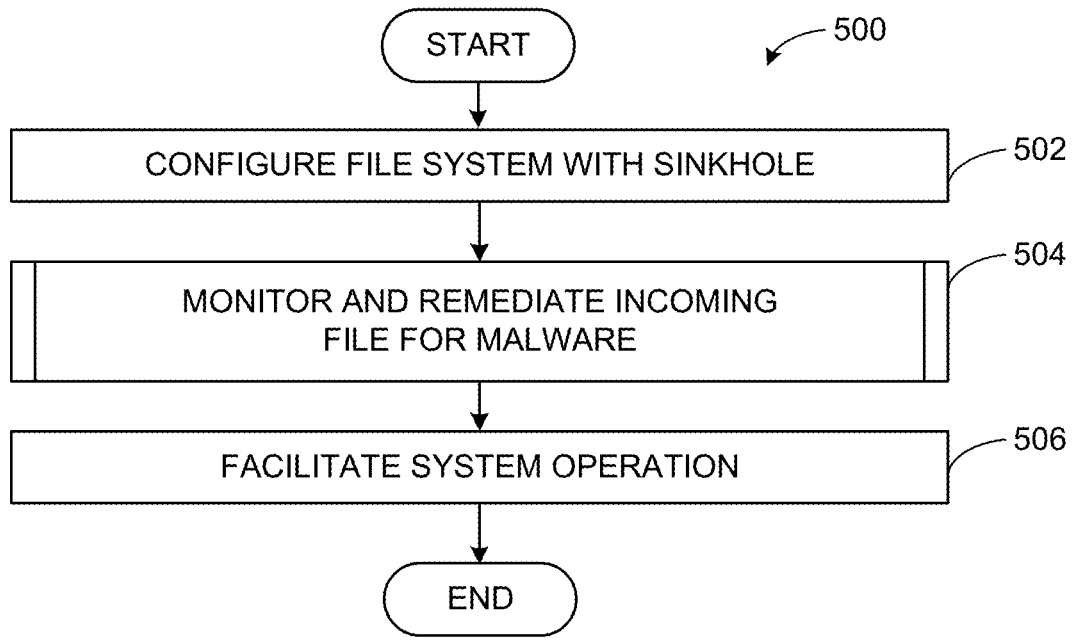
FIGS. 5, 7, and 8 are flowcharts representative of example machine-readable instructions that can be executed to implement the example processor of FIGS. 1, 2, 3, and/or 4 to process incoming files and protect against malware such as ransomware at an electronic device.
Figure 7:
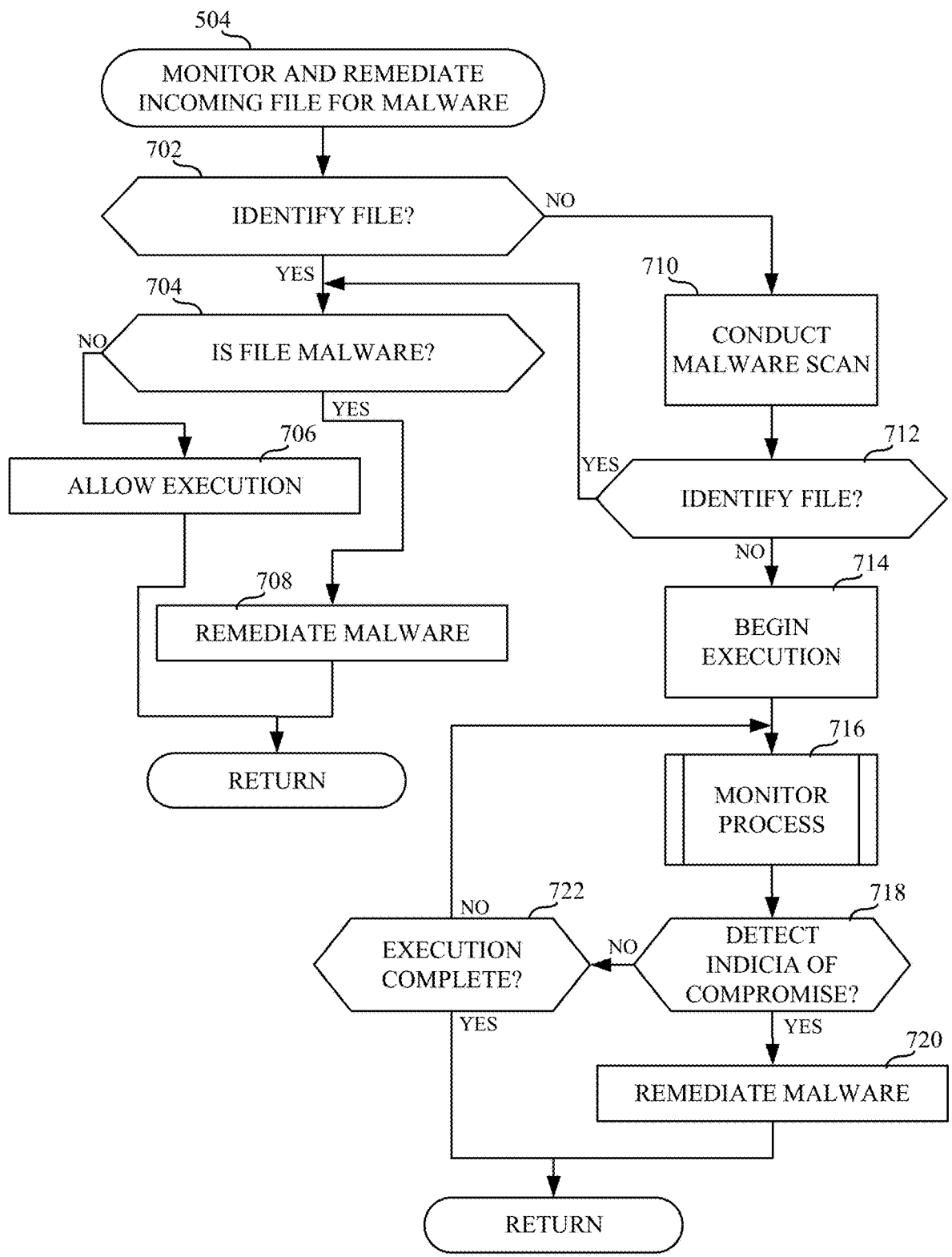

Flowcharts representative of example machine-readable instructions for implementing the example processor 215 of FIGS. 1, 2, 3, and/or 4 are shown in FIGS. 5, 7, and/or 8. In these examples, the machine-readable instructions comprise a program(s) for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof can alternatively be executed by a device other than the processor 912 and/or embodied in firmware or dedicated hardware. Further, although the example program is described with reference to the flowchart(s) illustrated in FIGS. 5, 7, and/or 8, many other methods of implementing the example processor 215 can alternatively be used. For example, the order of execution of the blocks can be changed, and/or some of the blocks described can be changed, eliminated, or combined. Additionally or alternatively, any or all of the blocks can be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5, 7, and/or 8 can be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 5 is a flowchart representative of example machine-readable instructions that can be executed to implement the example processor 115 of FIGS. 1, 2, 3, and/or 4 to process incoming files and protect against malware such as ransomware at the electronic device 110. The example program 500 of FIG. 5 begins when the example malware scanner 315 detects that a file and/or other communication 105 has been received at the interface 220 of the electronic device 110.

At block 502, the file system 310 is configured with a sinkhole. For example, the sinkhole generator 420 modifies the file system 310 to create the sinkhole as a recursive junction point (e.g., an NTFS junction, etc.) linking to a directory (e.g., "the sinkhole directory") in the file system 310 of the electronic device 110. Thus, a sinkhole folder or directory with one or more canary files can be generated with a junction or recursive mount point such as shown in the example recursive directory listing 600 of FIG. 6. The sinkhole is established with one or more junction points to cause the ransomware 115 to recursively generate files based on the initial content of the sinkhole. Such a folder structure allows the sinkhole to delay file encryption by the ransomware 115.

At block 504, the malware scanner 315 monitors and remediates an incoming file for malware. For example, as the ransomware process 115 attempts to navigate the recursive sinkhole, the analyzer 410 of the malware scanner 315 monitors application and system behavior to look for IOCs suggestive of the presence of ransomware and/or other malware. As encryption is delayed by the sinkhole, the analyzer 410 applies heuristics, machine learning, and/or other behavioral security application on monitored activities and/or other events generated by the ransomware 115, for example. However, as the analyzer 410 is processing the behavior of the ransomware 115 in the sinkhole, the file system 310 stays uninfected by the ransomware 115 as the ransomware 115 processes file listings from the sinkhole.

At block 506, normal system operation is facilitated. That is, after or while incoming file(s) and/or process(es) triggered by incoming file(s) are being monitored and, if warranted, processed to remediate malware, system operation is facilitated by the operating system 305, file system 310, etc. For example, after the incoming file has been identified as allowable and/or after the incoming file has been quarantined and/or deleted, the malware scanner 315, operating system 305, and file system 310 facilitate normal system operation (e.g., execution of applications, storage of data, modification of data, transmission of data, etc.). In certain examples, normal system operation continues by the operating system 305 and the file system 310 while the malware scanner 315 is observing behavior of a file (e.g., a ransomware process 115 associated with an incoming file, etc.). The malware scanner 315 then awaits another incoming file, link, etc., to be processed.

FIG. 7 is a flowchart representative of example machine-readable instructions that can be executed to configure the example processor 115 of FIGS. 1, 2, 3, and/or 4 to monitor and remediate an incoming file and/or other data communication for malware (e.g., block 504 of the example of FIG. 5). At block 702, the incoming file is analyzed by the analyzer 410 to evaluate whether the analyzer 410 can identify the file (e.g., as known ransomware and/or other malware, a legitimate file, etc.).

For example, a scan can be performed by the analyzer 410 of the example malware scanner 315 based on malware signatures and/or other malware detection information stored in the example storage 205. Malware signatures and/or other malware detection information stored in the storage 205 can be updated by, for example, communicating with an external server via the interface 220.

When the file is identified, at block 704, the identified file is evaluated to determine whether the file is malware. When the identified file is known to not be malware, then, at block 706, execution of and/or with respect to the file is allowed. However, when the identified file is known to be malware, then, at block 708, the malware is remediated. For example, the file can be blocked, quarantined, deleted, moved, etc., to eliminate the ransomware and/or hold the ransomware file away from usable content at the electronic device 110.

When the file is not identified by the analyzer 410, at block 710, a malware scan is conducted. For example, the analyzer 410 of the malware scanner 315 looks for known virus/malware signature information, comparison to definition files, and/or other file characteristic to identify the file. At block 712, the file is again analyzed following the malware scan to determine whether the analyzer 410 can identify the file based on results of the scan. For example, following the processing of the file by the analyzer 410, the analyzer 410 determines whether it can identify the file based on a similarity to known malware signature, verified malware characteristic, etc. If the file can be identified, then control shifts to block 704 to evaluate whether the identified file is or is not malware.

However, if the analyzer 410 is unable to identify the file, then, at block 714, the unidentified file is allowed to begin execution with respect to the sinkhole. At block 716, execution of a process associated with the file is monitored to determine whether the file is malware. For example, the analyzer 410 monitors file process execution for IOCs as the file's process navigates the sinkhole and/or other areas of the file system 310, operating system 305, etc.

At block 718, monitored information is evaluated by the analyzer 410 to determine whether the analyzer 410 detects any IOC. IOC such as particular file accesses, resource usage, file system read/write, directory processing, etc., to quantify and/or qualify the behavior of the file. Evidence of IOC can indicate that the file is malware such as ransomware, etc. When IOC indicates the presence of ransomware and/or other malware, then control shifts to block 720 to remediate the malware (e.g., through quarantine, deletion, etc., by the cleaner 425, etc.). If IOC are not detected and/or are insufficient to evaluate whether or not the file is malware, then monitoring continues at block 716 unless, at block 722, file process execution is determined to be complete.

In certain examples, when malware is detected, an alert is triggered, and the example alert controller 320 notifies another system (e.g., an external server), a user, an operator, an administrator, etc., via the display 210, interface 220, etc. The alert controller 320 can also generate a notification indicating whether identified malware (e.g., ransomware, etc.) has been successfully remediated (e.g., quarantined, deleted, etc.) or not, for example.

Figure 8:
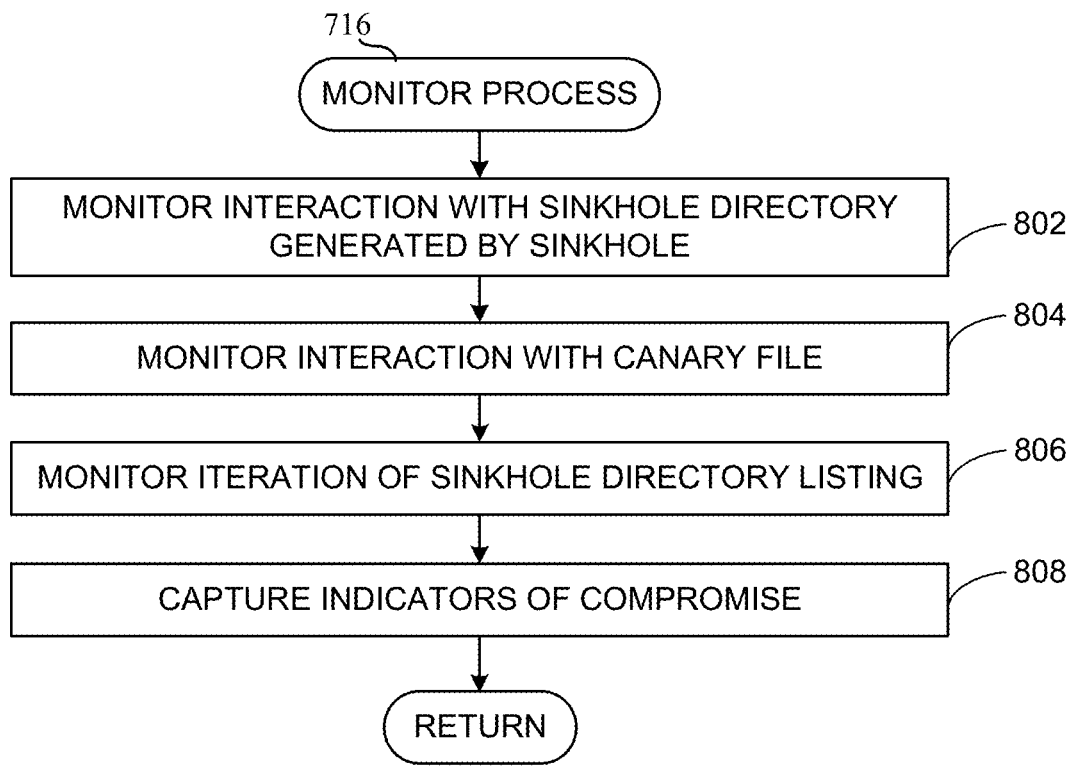

FIG. 8 is a flowchart representative of example machine-readable instructions that can be executed to configure the example processor 115 of FIGS. 1, 2, 3, and/or 4 to monitor file process execution (e.g., block 716 of the example of FIG. 7). At block 802, interaction between the monitored process and a sinkhole directory generated by the sinkhole is monitored. For example, execution of a process to generate a directory listing for the sinkhole is monitored and evaluated. At block 804, interaction with a canary file in the sinkhole directory is monitored. For example, interaction with a canary or decoy file in the sinkhole can help facilitate recursion in the directory listing by the monitored process.

At block 806, iteration of the sinkhole directory listing is monitored. For example, iteration/recursion in listing contents of the sinkhole directory (see, e.g., FIG. 6) can be monitored as the process (e.g., a ransomware process, etc.) explores the sinkhole directory and its canary file(s) and continues to try to index. At block 808, IOC(s) generated with respect to the operating system 305, file system 310, etc., through the interaction between the monitored process and the sinkhole directory/canary file structure are captured for further analysis by the analyzer 410 of the malware scanner 315, for example.

Figure 9:
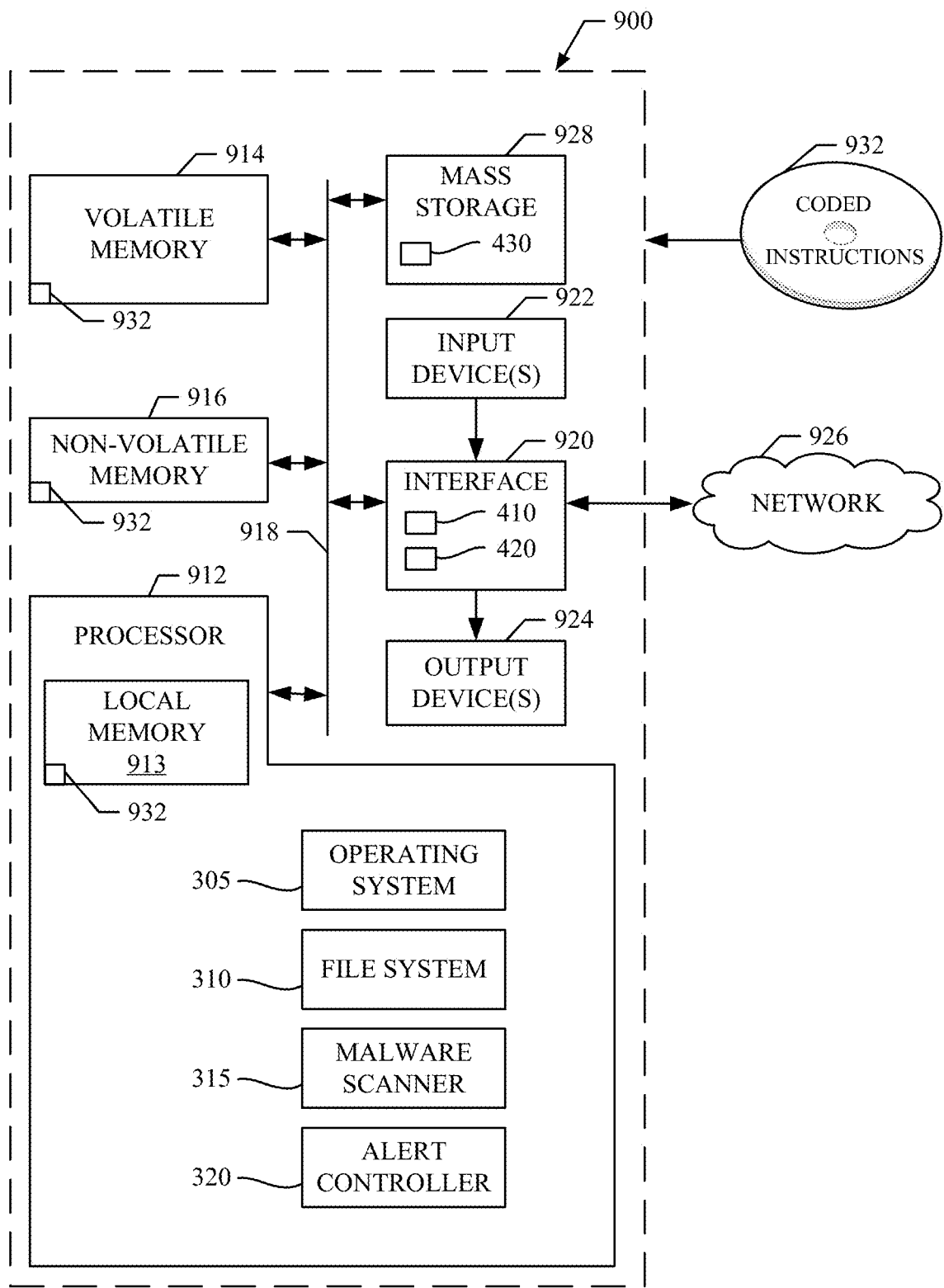
FIG. 9 is a block diagram of an example processor platform structured to execute the instructions of FIGS. 5, 7, and/or 8 to implement the processor of FIGS. 1, 2, 3, and/or 4.

FIG. 9 is a block diagram of an example processor platform 900 structured to execute the instructions of FIGS. 5, 7, and/or 8 to implement the processor 215 of FIGS. 1, 2, 3, and/or 4. The processor platform 900 can be, for example, a server, a personal computer, a laptop computer, a mobile device (e.g., a cell phone, a smart phone, a tablet such as an iPad™, etc.), a personal digital assistant (PDA), or any other type of electronic computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor can be a semiconductor based (e.g., silicon based) device. In this example, the processor 912 implements the example operating system 305, the example file system 310, the example malware scanner 315, and/or the example alert controller 320.

The processor 912 of the illustrated example includes a local memory 913 (e.g., a cache, etc.). The processor 912 of the illustrated example is in communication with a main memory including a volatile memory 914 and a non-volatile memory 916 via a bus 918. The volatile memory 914 can be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 can be implemented by flash memory and/or any other desired type of memory device. Access to the main memory 914, 916 is controlled by a memory controller.

The processor platform 900 of the illustrated example also includes an interface circuit 920. The interface circuit 920 can be implemented by any type of interface standard, such as an Ethernet interface, a universal serial bus (USB), and/or a PCI express interface. The example interface 920 can implement the example electronic device interface 220, for example.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. The example mass storage 928 of the illustrated example of FIG. 9 implements the example storage 205, for example.

The coded instructions 932 of FIGS. 5, 7, and/or 8 can be stored in the mass storage device 928, in the volatile memory 914, in the non-volatile memory 916, and/or on a removable tangible computer readable storage medium such as a CD or DVD.

From the foregoing, it will be appreciated that example methods, apparatus, and articles of manufacture have been disclosed that enable an electronic device (e.g., desktop computer, a laptop computer, a tablet computer, a smart phone, a game controller, etc.) to detect and remediate ransomware before the ransomware infects the device. The disclosed examples enable detection and remediation of ransomware even when the ransomware does not fit a known profile or virus signature based on collection and evaluation of a variety of indicators of compromise. Using a sinkhole, ransomware can be placed in a prolonged or infinite loop as it tries to generate a comprehensive directory listing, while legitimate software will exit the loop momentarily. Even advanced ransomware will process the sinkhole for many minutes (e.g., 10, 15, 30, compounded by nested sinkholes, etc.) before determining that the directory listing has the process in a loop. While the ransomware process from an incoming file is stuck in the recursive loop of the sinkhole, ransomware activity and attempts at access, etc., can be monitored to identify the process and associated file as ransomware. Once the ransomware has been identified, the ransomware can be remediated before harm is done to the electronic device or its files.

Example 1 includes a malware scanner to scan computer files. The malware scanner of Example 1 includes a sinkhole generator to generate a sinkhole directory. The malware scanner of Example 1 includes a storage device adapted to store a computer file and the sinkhole directory, wherein the sinkhole directory recursively expands when the computer file performs a file listing of the sinkhole directory to occupy the computer file by extending a period of time taken to perform the file listing of the sinkhole directory. The malware scanner of Example 1 also includes an analyzer to monitor execution of the computer file while the computer file is performing the file listing of the sinkhole directory to attempt to identify an indicator of compromise associated with the computer file, the analyzer to classify the computer file as ransomware when the analyzer identifies the indicator of compromise. The malware scanner of Example 1 also includes a cleaner to remediate the ransomware.

Example 2 includes the malware scanner of Example 1, wherein the cleaner is to interrupt the monitored execution when the computer file is identified as ransomware.

Example 3 includes the malware scanner of Example 1, wherein the indicator of compromise includes at least one of a file access, a resource usage, a file system access, or a directory processing.

Example 4 includes the malware scanner of Example 1, wherein the sinkhole generator is to generate the sinkhole directory at least one of a) on demand or b) continuously.

Example 5 includes the malware scanner of Example 1, wherein the sinkhole generator is to generate the sinkhole directory to include a canary file to be processed and to include a recursive junction to point back to the sinkhole directory.

Example 6 includes the malware scanner of Example 5, wherein the recursive junction includes a recursive file system mount point to recursively direct a process associated with the computer file to process the canary file.

Example 7 includes the malware scanner of Example 1, wherein the recursive junction includes a plurality of recursive file system mount points.

Example 8 includes at least one non-transitory machine-readable medium including instructions which, when executed, cause at least one processor to at least spawn a sinkhole directory to recursively expand when a file index of the sinkhole directory is performed to extend a period of time taken for a computer file to perform the file index of the sinkhole directory. The instructions of Example 8, when executed, further cause at least one processor to at least identify the computer file as ransomware in response to a presence of an indicator of compromise associated with execution of the computer file. The instructions of Example 8, when executed, further cause at least one processor to at least remediate the ransomware.

Example 9 includes the at least one non-transitory machine-readable medium of Example 8, wherein the instructions, when executed, further cause at least one processor to at least remediate the ransomware by interrupting the monitored execution when the computer file is identified as ransomware.

Example 10 includes the at least one non-transitory machine-readable medium of Example 8, wherein the indicator of compromise includes at least one of a file access, a resource usage, a file system access, or a directory processing.

Example 11 includes the at least one non-transitory machine-readable medium of Example 8, wherein the instructions, when executed, cause the at least one processor to spawn the sinkhole directory at least one of a) on demand or b) continuously.

Example 12 includes the at least one non-transitory machine-readable medium of Example 8, wherein the instructions, when executed, cause the at least one processor to include a canary file and a recursive junction in the sinkhole directory, the recursive junction to point back to the sinkhole directory.

Example 13 includes the at least one non-transitory machine-readable medium of Example 12, wherein the instructions, when executed, cause the at least one processor to include a recursive file system mount point in the recursive junction, the recursive file system mount point to recursively direct a process associated with the file to process the canary file.

Example 14 includes the at least one non-transitory machine-readable medium of Example 13, wherein the instructions, when executed, cause the at least one processor to include a plurality of recursive file system mount points in the recursive junction.

Example 15 includes a method to remediate ransomware on an electronic device. The method of Example 15 includes generating, by executing an instruction with at least one processor, a sinkhole directory, the sinkhole directory to recursively expand when a computer file performs a file listing of the sinkhole directory to delay the computer file by extending a period of time to perform the file listing. The method of Example 15 includes monitoring, by executing an instruction with the at least one processor, execution of the computer file while the computer file is performing the file listing of the sinkhole directory to attempt to identify an indicator of compromise associated with the computer file. The method of Example 15 includes classifying, by executing an instruction with the at least one processor, the computer file as ransomware in response to identification of the indicator of compromise. The method of Example 15 includes remediating the ransomware by executing an instruction with the at least one processor.

Example 16 includes the method of Example 15, further including interrupting the execution of the file in response to the identification of the file as ransomware.

Example 17 includes the method of Example 15, wherein the indicator of compromise includes at least one of a file access, a resource usage, a file system access, or a directory processing.

Example 18 includes the method of Example 15, wherein the generating of the sinkhole directory is performed at least one of a) on demand or b) continuously.

Example 19 includes the method of Example 15, wherein the generating of the sinkhole directory further includes generating a canary file and a recursive junction in the sinkhole directory.

Example 20 includes the method of Example 19, wherein the recursive junction includes a recursive file system mount point to recursively direct a process associated with the computer file to process the canary file.

Example 21 includes the method of Example 20, wherein the recursive junction includes a plurality of recursive file system mount points.

Example 22 includes an apparatus to remediate ransomware. The apparatus of Example 22 includes means for generating a canary file and a recursive junction in a sinkhole directory, the recursive junction to point back to the sinkhole directory, the recursive junction to cause the sinkhole directory to recursively expand when a computer file performs a file listing of the sinkhole directory to extend a period of time taken to perform the file listing of the sinkhole directory. The apparatus of Example 22 includes means for identifying the computer file as ransomware while the computer file is performing the file listing of the sinkhole directory based on an indicator of compromise. The apparatus of Example 22 includes means for remediating the ransomware.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A malware scanner to scan computer files, the malware scanner comprising:
   at least one storage device; and
   at least one processor, wherein the at least one processor is to implement:
   a sinkhole generator to generate a sinkhole directory, wherein the sinkhole directory is to recursively expand when a computer file performs a file listing of the sinkhole directory to occupy the computer file by extending a period of time taken to perform the file listing of the sinkhole directory, and wherein the sinkhole generator is to generate the sinkhole directory to include a canary file to be processed and to include a recursive junction to point back to the sinkhole directory, the recursive junction to include a plurality of recursive file system mount points to recursively direct a process associated with the computer file to process the canary file;

an analyzer to monitor execution of the computer file while the computer file is performing the file listing of the sinkhole directory to attempt to identify an indicator of compromise associated with the computer file, the analyzer to classify the computer file as ransomware when the analyzer identifies the indicator of compromise; and a cleaner to remediate the ransomware, wherein the sinkhole generator, the analyzer, and the cleaner are implemented using software and executed by the at least one processor.

2. The malware scanner of claim 1, wherein the cleaner is to interrupt the execution of the computer file when the computer file is identified as ransomware.

3. The malware scanner of claim 1, wherein the indicator of compromise includes at least one of a file access, a resource usage, a file system access, or a directory processing.

4. The malware scanner of claim 1, wherein the sinkhole generator is to generate the sinkhole directory at least one of a) on demand or b) continuously.

5. At least one non-transitory machine-readable medium comprising instructions which, when executed, cause at least one processor to at least:

spawn a sinkhole directory to recursively expand when a file index of the sinkhole directory is performed to extend a period of time taken for a computer file to perform the file index of the sinkhole directory, the sinkhole directory to include a canary file to be processed and to include a recursive junction to point back to the sinkhole directory, the recursive junction to include a plurality of recursive file system mount points to recursively direct a process associated with the computer file to process the canary file;

identify the computer file as ransomware in response to a presence of an indicator of compromise associated with execution of the computer file; and remediate the ransomware.

6. The at least one non-transitory machine-readable medium of claim 5, wherein the instructions, when executed, further cause the at least one processor to remediate the ransomware by interrupting the execution of the computer file when the computer file is identified as ransomware.

7. The at least one non-transitory machine-readable medium of claim 5, wherein the indicator of compromise includes at least one of a file access, a resource usage, a file system access, or a directory processing.

8. The at least one non-transitory machine-readable medium of claim 5, wherein the instructions, when executed, cause the at least one processor to spawn the sinkhole directory at least one of a) on demand or b) continuously.

9. A method to remediate ransomware on an electronic device, the method comprising:

generating, by executing an instruction with at least one processor, a sinkhole directory, the sinkhole directory to recursively expand when a computer file performs a file listing of the sinkhole directory to delay the computer file by extending a period of time to perform the file listing, the generating of the sinkhole directory including generating a canary file and a recursive junction in the sinkhole directory, the recursive junction to include a plurality of recursive file system mount points to recursively direct a process associated with the computer file to process the canary file;

monitoring, by executing an instruction with the at least one processor, execution of the computer file while the computer file is performing the file listing of the sinkhole directory to attempt to identify an indicator of compromise associated with the computer file;

classifying, by executing an instruction with the at least one processor, the computer file as ransomware in response to identification of the indicator of compromise; and remediating the ransomware by executing an instruction with the at least one processor.

10. The method of claim 9, further including interrupting the execution of the computer file in response to the identification of the computer file as ransomware.

11. The method of claim 9, wherein the indicator of compromise includes at least one of a file access, a resource usage, a file system access, or a directory processing.

12. The method of claim 9, wherein the generating of the sinkhole directory is performed at least one of a) on demand or b) continuously.

\* \* \* \* \*